(12) United States Patent
Smith et al.

(10) Patent No.: US 7,675,737 B1
(45) Date of Patent: *Mar. 9, 2010

(54) LOW TEMPERATURE NON-AQUEOUS ELECTROLYTE

(75) Inventors: W. Novis Smith, Philadelphia, PA (US); Joel R. McCloskey, Philadelphia, PA (US)

(73) Assignee: Lithdyne LLC, Folcroft, PA (US)

( * ) Notice: Subject to any disclaimer, the term of this patent is extended or adjusted under 35 U.S.C. 154(b) by 27 days.

This patent is subject to a terminal disclaimer.

(21) Appl. No.: 12/217,209

(22) Filed: Jul. 2, 2008

(51) Int. Cl.
*H01G 9/00* (2006.01)

(52) U.S. Cl. ............ 361/523; 361/516; 361/519; 361/525; 361/528; 361/529

(58) Field of Classification Search .......... 361/523, 361/516–519, 525–541, 502–504; 252/62.2; 29/25.01, 25.03
See application file for complete search history.

(56) References Cited

U.S. PATENT DOCUMENTS

| 6,535,373 | B1 * | 3/2003 | Smith et al. ............ 361/504 |
| 6,728,096 | B1 * | 4/2004 | Smith et al. ............ 361/523 |
| 6,902,684 | B1 * | 6/2005 | Smith et al. ............ 252/62.2 |
| 7,099,145 | B2 * | 8/2006 | Kobayashi et al. ...... 361/523 |
| 7,411,777 | B2 * | 8/2008 | Chiba ..................... 361/502 |
| 7,430,108 | B2 * | 9/2008 | Ozawa et al. ........... 361/523 |
| 7,436,651 | B2 * | 10/2008 | Takeda et al. ........... 361/502 |

* cited by examiner

*Primary Examiner*—Nguyen T Ha
(74) *Attorney, Agent, or Firm*—John Lezdey & Assoc

(57) ABSTRACT

The present invention provides electrolytes for use in electronic devices at temperature below −50° C. consisting of a mixture, eutectic or tereutectic of at least two low viscosity aprotic solvents, acetonitrile, and a mixture of conductive salts having a molecular weight up to 240.

13 Claims, 1 Drawing Sheet

ELECTROLYTE BECOMES SLIGHTLY SLUSHY AT -38°C

ELECTROLYTE BECOMES FROZEN AT -48°C

LOW TEMPERATURE NON-AQUEOUS ELECTROLYTE

FIELD OF THE INVENTION

The present invention relates to electrolytes which are useful for various electrochemical elements. More particularly, there is provided electrolytes which are useful at low temperatures, especially for use in electronic devices at high altitudes and super capacitors and double layer capacitors (DLCs) in combination with high boiling aprotic solvents which function at temperatures below 50° C.

BACKGROUND OF THE INVENTION

Electrolytes are usually composed of an ionic salt which is soluble in a coordinating or solvating solvent such as water or in the non-aqueous systems, such as acetonitrile, ethylene carbonate, dimethyl carbonate, sulfur dioxide, etc. The limitations on electrolytes are the solubility of the salt, the nature of the application, i.e., lithium batteries require lithium salts, and non-aqueous capacitors require a quaternary ammonium salt usually tetrafluoroborate. The overall conductivity of the system is important with higher conductivity more important than other factors. The non-aqueous electrolytes are usually from 3 mS/cm up as high as 70 mS/cm, while aqueous systems range up to 140 mS/cm. Another group of electrolytes are the ionic liquids which are conductive salts which have melting points below room temperature such as 1,3-ethylmethylimidazolium tetrafluoroborate (m.p. 15° C.) with a conductivity at 25° C. of 12 mS/cm which is among the highest of the usual ionic liquids. There are many ionic liquids which can have various organic cations or different anions. In capacitors that use electrolytes, the temperature has a major influence on the electrolyte in the performance of the capacitor since the conductivity of the electrolyte decreases with temperature.

There is a continuing need to have liquid electrolytes which function at very low temperatures. <−50° C. and even down to −75° C. with good conductivity, >2 mS/cm. (Aqueous electrolytes are all frozen by −20 or −30° C.). The organic electrolytes in advanced capacitors are generally good down to −30 or −40° C. before they freeze or go to glass. The lowest temperature electrolytes in lithium batteries (primary or secondary) have some conductivity down to −40 to −50° C. before performance stops due to conductivity being reduced to less than 1 mS/cm or they freeze or go to a glass. There are other electronic components such as sensors and specialized displays which are dependent on liquid electrolytes which also will limit or stop performance below −50° C. For electronic applications at high altitude, in space, in satellites or outside of planes in flight, where temperatures below −50° C. are encountered routinely, there is a need for such low temperature electrolytes. Currently these systems must have additional heat input and are insulated to function, all contributing to extra power usage and extra weight.

U.S. patent application Ser. No. 11/647,713 to Smith et al, which is herein incorporated by reference, relates to electrolyte solutions with tetraalkylammonium tetrafluoroborates, N,N-dialkylpyrrolidinyl tetrafluoroborates, and spiro-pyrrolidinyl tetrafluoroborates in a eutectic mixture of non-nitrile solvents with ethylene carbonate for use over a wide range of temperatures. The electrolytes freeze at about 48° C.

U.S. Pat. No. 6,902,683 to Smith et al, which is herein incorporated by reference relates to electrolytes of a complex salt formed by mixing of a tetraalkyl ammonium salt of hydrogen fluoride with an imidazolium compound in a nitrite solvent which operate at temperatures between −60 and 150° C. However, the conductivity decreases at the extremely low temperatures.

The article of Ue in *J. electrochem. Soc.* Vol 141, No. 11, November 1994 entitled "*Electrochemical Properties of Organic Liquid Electrolytes Based on Quaternary Onium Salts for Electrical Double-Layer Capacitors*" which is herein incorporated by reference, discloses high permittivity solvents and onium salts for double-layer capacitors. Specifically studied were quaternary onium tetrafluoroborate salts which showed greater solubility in the solvents.

U.S. Pat. No. 5,418,682 to Warren et al, which is herein incorporated by reference discloses a method of preparing tetraalkyl ammonium tetrafluoroborate salts for use as electrolytes with dinitrile mixtures as solvents.

U.S. Pat. No. 5,965,054 to McEwen et al, which is herein incorporated by reference discloses non-aqueous electrolytes for electrical storage devices utilizing salts consisting of alkyl substituted, cyclic delocalized aromatic cations and their perfluoro derivatives with alkyl carbonate solvents.

U.S. Pat. Nos. 6,535,373 and 6,902,684 to Smith et al, which are herein incorporated by reference, disclose similar electrolytes which utilize nitrite solvents primarily.

SUMMARY OF THE INVENTION

The invention provides for improved electrolyte formations for electronic devices which retain higher conductivity and voltage at low temperatures. Accordingly there is provided electrolytes comprising mixtures, eutectics and tereutectic of low viscosity aprotic solvents which contains acetonitrile and a mixture of conductive salts having a molecular weight up to 240 selected from the group consisting of a) an imidazolium compound of the formula:

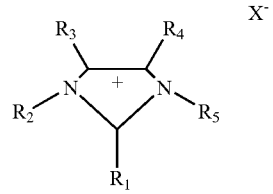

wherein $R_1$, $R_2$, $R_3$, $R_4$, and $R_5$ are the same or different and are selected from the group consisting of hydrogen, an alkyl of 1-4 carbon atoms, or fluoroalkyl, with the proviso that at least one of $R_1$, $R_2$, $R_3$, $R_4$, and $R_5$ being hydrogen.

b) an ammonium compound of the formula:

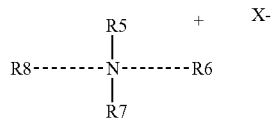

wherein $R_5$, $R_6$, $R_7$, and $R_8$ are the same or different and consists of alkyl of 1-4 carbon atoms, or fluoroalkyl, and c) a pyrrolidinyl compound of the formula;

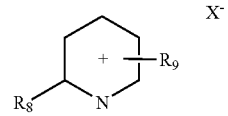

wherein $R_8$, and $R_9$ are the same or different and consists of alkyl of 1-4 carbon atoms, said salts each being present in a molar concentration of at least 0.4; selected from the group consisting of tetrafluoroborate ($BF_4^-$) hexafluoroarsenate ($AsF_6^-$), hexafluorophosphate ($PF_6^-$), fluoro hydrogen fluoride $F(HF^-)x$, wherein x=1 to 4, ($SbF_6^-$), ($CF_3BF_3^-$), trifluoromethylsulfonate (triflate), and bis (trifluoromethylsufonyl)imide (imide) in a concentration of about 0.4 to 2.5M.

OBJECTS OF THE INVENTION

It is a general object of the invention to provide a non-aqueous electrolyte having high conductivity and voltage at temperatures below −50° C. that can be used in electrical storage devices.

It is another object of the invention to provide a non-aqueous electrolyte having reduced viscosity and increased conductivity by lowering the effective melting points.

It is yet another object of the invention to provide a non-aqueous electrolyte for use in lithium-ion batteries and carbon electrode capacitors.

These and other objects and advantages will become apparent from a reading of the description of the preferred embodiments together with the accompanying drawings.

DESCRIPTION OF THE PREFERRED EMBODIMENTS

Figure 1:
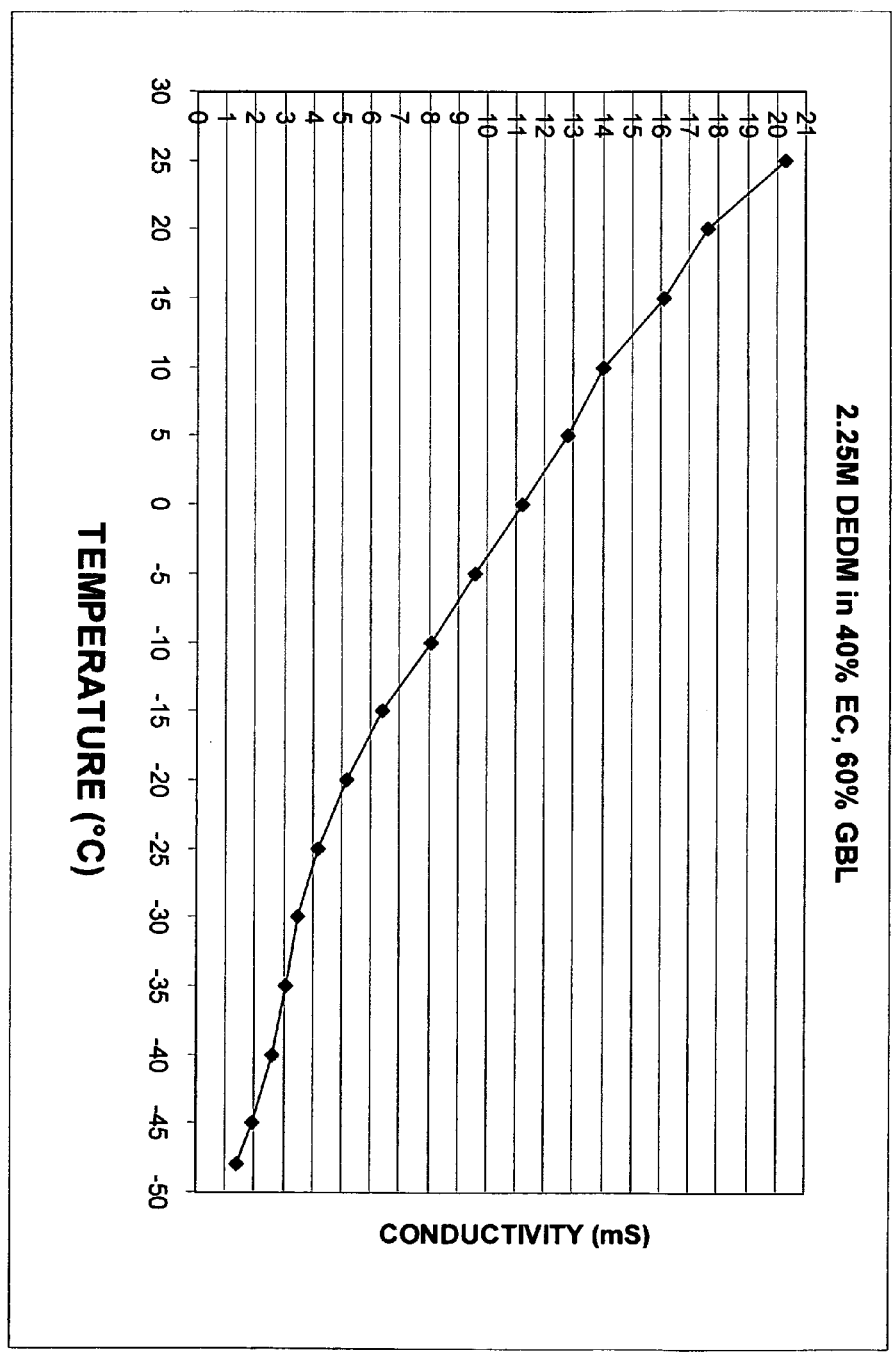
FIG. 1 is a graph of 2.25 M diethyldimethyl ammonium trifluoroborate in 40% ethyl carbonate and 60% gammabutyrolactone.

According to the present invention there is provided non-aqueous electrolytes for use in electrochemical devices which function at temperatures below −50° C. The electrolytes comprise a mixture, eutectic or tereutectic of at least two low viscosity aprotic solvents which contain 25-75% acetonitrile and a mixture of at least two conductive salts having a molecular weight of up to 240 selected from the group consisting of;

(a) an imidazolium compound of the formula (I):

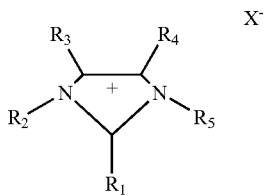

I wherein $R_1$, $R_2$, $R_3$, $R_4$, and $R_5$, are the same or different and are selected from the group consisting of hydrogen, an alkyl of 1-4 carbon atoms, and fluoroalkyl groups, with the proviso that at least one of the $R_1$, $R_2$, $R_3$, $R_4$ and $R_5$ is hydrogen;

(b) an ammonium compound of the formula (II):

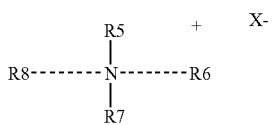

II wherein $R_5$, $R_6$, $R_7$, and $R_8$ are the same or different and consist of alkyl of 1-4 carbon atoms, or fluoroalkyl groups, and (c) a pyrrolidinyl compound of the formula (III);

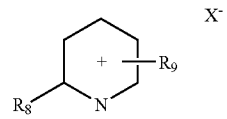

III

Wherein $R_8$, $R_9$ are the same or different and consists of alkyl of 1-4 carbon atoms, said salt being present in a molar concentration of at least 0.4 M, and an anion selected from the group consisting of tetrafluoroborate ($BF_4^-$) hexafluoroarsenate ($AsF_6^-$), hexafluorophosphate ($PF_6^-$), fluoro hydrogen fluoride ($F(HF)x^-$), wherein x is 1-4, ($SbF_6^-$), ($CF_3BF_3^-$), trifluoromethylsulfonate (triflate$^-$), and bis (trifluoromethylsulfonyl) imide (imide$^-$).

The F(HF)x- salt can comprise the anion of formula I, II, and III or a mixture thereof. The quaternary ammonium F(HF)x salts which may be used include tetraethylammonium F(HF)x, trimethyl (n-butyl) ammonium F(HF)x, methyltrimethyl ammoniumn F(HF)x and diethyldimethyl ammonium F9HF0x.

Preferred salts are where the cation is 1,3-dialkyl imidazolium, (most preferably, 1-ethyl-3-methylimidazolium, 1-methyl-3-methylimidazolium, 1,2-dimethyl-3-propylimidazolium), and trimethylethyl ammonium, trimethyl, n-propylammonium diethyldimethyl ammonium, and tetraethyl ammonium and the anion is tetrafluoroborate, hexafluoroarsenate or hexafluorophosphate and F(HF)x.

Preferred aprotic solvents include dimethyl sulfone, sulfolane tetramethylene sulfone (butyrosulfone), ethylene carbonate, gamma butyrolactone, 1,2-dimethoxyethane, propylene carbonate, dimethylcarbonate, methyl acetate and methyl formate.

The mixture of quaternary salts and the mixture of aprotic solvents have low enough crystal dissociation energies and high solubility to resist freezing/glassing effects and with the addition of acetonitrile of about 25-75% remains liquid down to at least −75° C. with a conductive of above 2 mS/cm.

Preferable is where the anion is a complex fluoride ion with HF such as F(HF)x wherein x is from 0.5 to 3, preferably 2.3.

It has been found that the addition of small amounts (5-40%) of aprotic non-aqueous coordinating/solving solvents enhance the conductivity up to 3 times higher than in the case of acetonitrile alone. The low temperature properties are greatly enhanced since the viscosity has been reduced and therefore the conductivity has been increased at a given temperature. Since the ionic liquids already start with a good conductivity at room temperature and the addition of solvents such as acetonitrile can increase the conductivity three fold, these make an excellent starting point for achieving very low temperature conducting liquid electrolytes.

However, even (EMIBF$_4$) one of the best ethylmethylimidazolium tetrafluoroborates has a reduced conductivity at −60° C. In order to increase the conductivity below this temperature we need to lower the viscosity and the effective melting point. It has been found that one effective way to do this is to make mixtures of salts and then only add enough solvents to achieve the maximum conductivity <−60° C. These solutions with very low freezing and glassing points are actually acting as eutectics and tereutectics with the different effective ionic liquids and solvents and their mixtures with the tetraalkyle ammonium salts. For instance a 50:50 mixture of 1,3-dimethylimidazolium tetrafluoroborate ($DMIBF_4$) [m.p.20° C.] and $EMIBF_4$ [m.p.15° C.] in 30% (1:1) EC-GBL now freezes at −18° C. When 30% acetonitrile is added to this mixture the mixed electrolyte now remains liquid down to at least −75° C. with a conductivity of 3.4 mS/cm.

Only salts primarily ionic liquids and a few quaternary salts which have low enough crystal dissociation energies and high solubilities in select aprotic non aqueous solvents respond to give this very low temperature freezing/glassing effect with reasonable conductivity (and reduced viscosity).

Lower molecular weight quarternary tetraalkylammonium cations can also be mixed into the mixed salt system. The eutectic can consist of a mix of cations and anions with the freezing/glassing point and viscosity further reduced with the addition from 1 to 40% by weight solvent or different solvents from the group dimethyl sulfone, sulfolane (butyrosulfone), tetramethylane sulfone, ethylene carbonate, propylene carbonate, dimethyl carbonate, ethyl methyl carbonate, succinonitrile, gamma butyrolactone, 1,2-dimethoxyethane, methyl acetate, methyl formate and further with 25-75% acetonitrile. The desired effect of acetonitrile diminishes as its concentration goes outside of the 25-75% as a percent of the organic solvent.

As seen in FIG. 1, a 2.25M of diethyldimethylammonium tetrafluoroborate ($DEDMABF_4$) sharply decreases in conductivity at low temperatures and at about −25° C. the conductivity falls below 4.2 mS/cm. This shows that the increase in molarity alone for an electrolyte with a single salt was insufficient to improve its use at temperatures below −50° C.

A preferred solvent comprises the combination of ethylene carbonate (EC) and gamma butyrolactone (GBL) wherein ethylene carbonate comprises at least 20% by weight, preferably 40 to 60% by weight and about 30% acetonitrile.

The salt concentration is at least 1.0M, preferably 1.5 to 5.2M most preferred range is 1.5-3.2M. A mixture with spiro also provide good low temperature efficiency.

It has been found that optimum formulation for these aprotic high boiling electrolytes is 2.5-2.8M of 1-ethyl-3-methyl imidazolium tetrafluoroborate ($EMIBF_4$), in 40% EC/60% GBH with the maximum conductivity of 26.8 mS/cm; and that the optimum formulation is 2.5-3.2M in 60% EC/40% GBL by weight for 1,3-dimethylimidazolium tetrafluoroborate ($DMIBF_4$) electrolytes with the maximum conductivity of 23.8 mS/cm, and improves with the addition of acetonitrile at lower temperatures. This maximum conductivity is limited by the viscosity of these electrolytes. These improvements are seen more significant for these electrolytes because the ionic salt content is more than twice as much as the current electrolytes which results in even better efficiency in charge/discharge capacitance than implied from the conductivity values alone.

It was found that ethylene carbonate (EC) was essential to achieve significant improvement in conductivity over the current non-acetonitrile aprotic electrolytes (18-19 mS/cm) based on propylene carbonate (PC). The problem with EC is that it has a melting point about 36° C. and readily precipitates out of the solution on cooling to low temperatures. Thus PC based electrolytes which have satisfactory low temperature performance down to −20° C. cannot contain significant amounts of EC. It was found that a synergistic effect occurs with the combined use of PC and EC and mixed salts of $DMIBF_4$ and $EMIBF_4$ to about molar equivalent amounts results in the formation of conductive liquid eutectic mixtures at room temperature although viscous. It was further found that the addition of gamma butyrolactone (GBL) in amounts up to 85% of the weight of the EC in the mixture maximizes the conductivity of these electrolyte formulations and also results in excellent low temperature performance down to −50° C. These mixtures also have the distinct advantage of not being flammable with the use of only these high boiling solvents (bp>208° C.) and the high percentage of the liquid quaternary salts (>20% by weight).

EXAMPLE 1

A study was conducted to determine the conductivity (mS/cm) of mixed salts and mixed solvents at various temperatures with 70% acetonitrile.

| Various $BF_4$ Salts in 70% AN, 20% EC, 10% MF | | |
|---|---|---|
| TEMP. | 1M DEDMA/1M DMI | 1M EMI/1M DMI |
| 25 | 50.1 | 50.8 |
| 20 | 47.5 | 48.3 |
| 15 | 45.1 | 45 |
| 10 | 41.6 | 42.4 |
| 5 | 39.4 | 39.8 |
| 0 | 36.6 | 37 |
| −5 | 34.4 | 34.7 |
| −10 | 31.5 | 32 |
| −15 | 28.9 | 29.5 |
| −20 | 26.1 | 26.9 |
| −25 | 23.9 | 24.4 |
| −30 | 21.4 | 21.8 |
| −35 | 19.1 | 19.4 |
| −40 | 16.4 | 16.8 |
| −45 | 14.3 | 14.6 |
| −50 | 11.9 | 12 |
| −55 | 10.7 | 10.1 |
| −60 | 9 | 8.6 |
| −65 | | |
| −70 | | |

DEDMA = diethyl dimethyl ammonium $BF_4$
DMI = dimethyl imidazolium $BF_4$
EMI = ethylmethylimidazolium $BF_4$
MF = methyl formate Results At −50° C. the electrolyte with mixed salts and mixed solvent with 70% acetonitrile maintained a conductivity above 10 mS/cm.

COMPARATIVE EXAMPLE 1

A study was conducted to determine the conductivity (mS/cm) of mixed salts and mixed solvents at various temperatures with 15% acetonitrile.

| Various $BF_4$ Salts in 15% AN, 40% EC, 25% GBL, 20% MF | | |
|---|---|---|
| TEMP. | 1M DEDMA/1M DMI | 1M EMI/1M DMI |
| 25 | 33.9 | 34.2 |
| 20 | 31.4 | 31.8 |
| 15 | 30.2 | 30.3 |
| 10 | 28.0 | 28.2 |
| 5 | 25.8 | 26.2 |
| 0 | 23.1 | 24.1 |
| −5 | 21.6 | 22.4 |
| −10 | 20.0 | 20.4 |
| −15 | 18.2 | 18.6 |
| −20 | 15.4 | 16.2 |

-continued

Various BF$_4$ Salts in 15% AN, 40% EC, 25% GBL, 20% MF

| TEMP. | 1M DEDMA/1M DMI | 1M EMI/1M DMI |
|---|---|---|
| −25 | 13.8 | 14.5 |
| −30 | 12.3 | 12.6 |
| −35 | 10.1 | 11.1 |
| −40 | 8.6 | 9.6 |
| −45 | 6.8 | 8.1 |
| −50 | 5.9 | 6.9 |
| −55 | 5.4 | |
| −60 | 3.9 | |
| −65 | 2.9 | |
| −70 | | |

DEDMA = diethyl dimethyl ammonium BF$_4$
DMI = dimethyl imidazolium BF$_4$
EMI = ethylmethylimidazolium BF$_4$

COMPARATIVE EXAMPLE 2

A study was conducted to determine the conductivity (mS/cm) of mixed salts and mixed solvents without acetonitrile at various temperatures and also the difference with a single salt at the same concentration (2M).

Various BF$_4$ Salts in 35% EC, 45% GBL, 20% MF

| TEMP. | 1M DEDMA/1M DMI | 1M EMI/1M DMI | 2M EMI | 2M DEDMA |
|---|---|---|---|---|
| 25 | 27.2 | 28.4 | 29.1 | 26.3 |
| 20 | 25.5 | 27.1 | 27.1 | 24.8 |
| 15 | 24.4 | 25.0 | 25.2 | 23.0 |
| 10 | 22.2 | 23.0 | 23.3 | 21.3 |
| 5 | 19.8 | 21.2 | 21.6 | 19.7 |
| 0 | 18.0 | 19.5 | 20.0 | 18.2 |
| −5 | 16.6 | 17.6 | 17.8 | 16.4 |
| −10 | 15.0 | 15.9 | 15.8 | 14.5 |
| −15 | 13.2 | 14.3 | 14.0 | 12.5 |
| −20 | 11.6 | 12.9 | 12.2 | 11.3 |
| −25 | 10.3 | 11.1 | 10.6 | 10.1 |
| −30 | 8.7 | 9.2 | 9.3 | 8.8 |
| −35 | 7.2 | 7.8 | 7.2 | 7.2 |
| −40 | 6.0 | 6.1 | 6.1 | 6.1 |
| −45 | 4.8 | 4.9 | 5.1 | 5.1 |
| −50 | 3.8 | 3.6 | 3.9 | 4.2 |
| −55 | 2.9 | 2.8 | 2.9 | 3.3 |
| −60 | 2.3 | 2.0 | 2.2 | 2.3 |
| −65 | 1.4 | 1.3 | 1.8 | |
| −70 | | 0.9 | | |

DEDMA = diethyl dimethyl ammonium BF$_4$
DMI = dimethyl imidazolium BF$_4$
EMI = ethylmethylimidazolium BF$_4$ Results At about −30° C. the conductivity of the single salt electrolyte was below 10 mS/cm.

What is claimed:

1. A non-aqueous electrolyte for electrochemical devices that function below −50° C. which comprises a mixture, eutectic or tereutectic of at least two low viscosity aprotic solvents which includes 20 to 75% acetonitrile and a mixture of conductive salts having a molecular weight of up to 240 selected from the group consisting of;

a) an imidazolium compound of the formula:

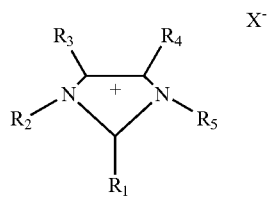

wherein $R_1$, $R_2$, $R_3$, $R_4$, and $R_5$ are the same or different and are selected from the group consisting of hydrogen, an alkyl group of 1-4 carbon atoms, or fluoroalkyl, with the proviso that at least one of $R_1$, $R_2$, $R_3$, $R_4$, and $R_5$ being hydrogen;

b) an ammonium compound of the formula:

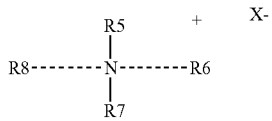

wherein $R_5$, $R_6$, $R_7$, and $R_8$ are the same or different and consists of alkyl group of 1-4 carbon atoms, or fluoroalkyl, and c) a pyrrolidinyl compound of the formula;

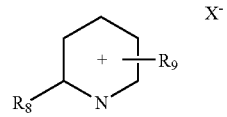

wherein $R_8$, and $R_9$ are the same or different and consists of alkyl group of 1-4 carbon atoms, and an anion selected from the group consisting of tetrafluoroborate ($BF_4^-$), hexafluoroarsenate ($AsF6$)$^-$, hexafluorophosphate ($PF_6^-$), fluoro hydrogen fluoride $F(HF)x^-$, wherein x=1 to 4, ($SbF_6^-$), ($CF_3BF_3^-$), trifluoromethylsulfonate (triflate), and bis (trifluoromethylsufonyl) imide.

2. The electrolyte of claim 1 wherein one of said salts is 1,3-dimethylimidazolium tetrafluoroborate.

3. The electrolyte of claim 1 wherein the solvent is ethylene carbonate and gamma butyrolactone.

4. The electrolyte of claim 3 wherein said solvent comprises 30 to 75% by weight of acetonitrile.

5. The electrolyte of claim 3 which includes about 1 to 20% by weight of a member selected from the group consisting of methyl acetate, methylene chloride, and methyl formate.

6. The electrolyte of claim 1 where the salts comprise 1,3-dimethylimidazolium tetrafluoroborate and 1-ethyl-3-methylimidazolium tetrafluoroborate.

7. The electrolyte of claim 6 wherein the salt concentration is 2.5 to 4.5 M.

8. The electrolyte of claim 7 including about 1 to 15% of a solvent selected from the group consisting of methylene chloride, methyl acetate and methyl formate.

9. The electrolyte of claim 1 including two members selected from the group consisting of methyl triethylammonium tetrafluoroborate, diethyldimethylammonium tetrafluoroborate and trimethylethylammonium tetrafluoroborate.

10. Electrolyte of claim 1 including 2 members from the group 1-ethyl-methylpyrrolidinyl, boron tetrafluoride; 1,1-dimethylpyrrolidinyl boron tetrafluoride; bix (1,1-tetramethylene ammonium boron tetrafluoride and spiro.

11. The electronic device of claim 10 in which the conductive salts of the electrolyte comprise inimidazolium tetrafluoroborate and tetraalkyl ammonium tribluoroborate.

12. The electronic device of claim 10 which is a double layer capacitor.

13. In an electronic device containing a non-aqueous electrolyte, the improvement which comprises the electrolyte of claim 1.

* * * * *